Figure 1:
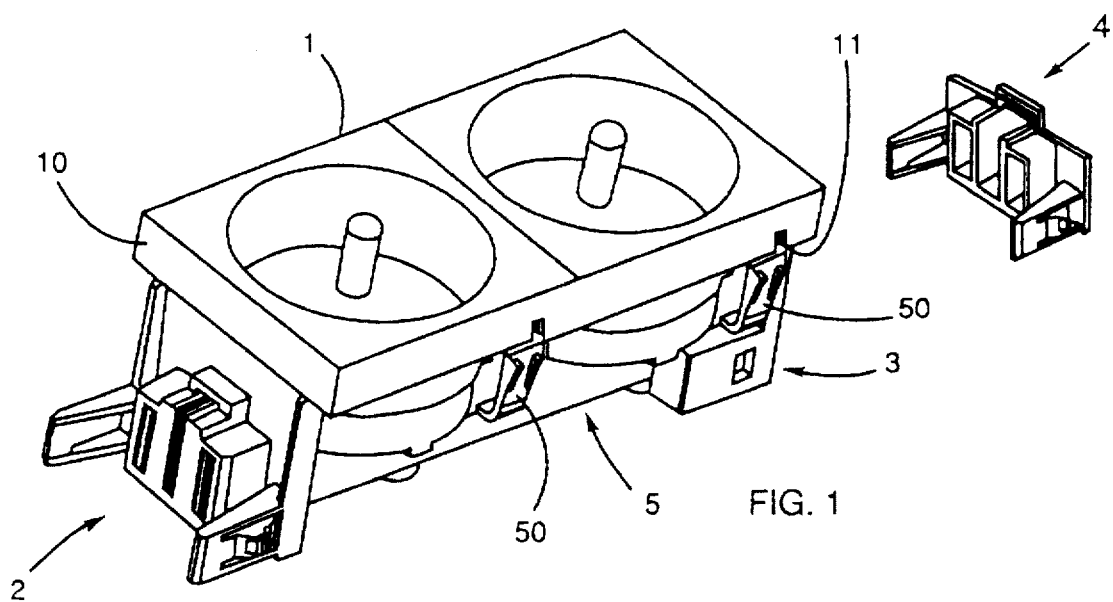

United States Patent [19]

Blanchot et al.

[11] Patent Number: 5,685,744
[45] Date of Patent: Nov. 11, 1997

[54] ELECTRIC DEVICE WITH MODULAR COMPONENTS

[75] Inventors: Michèle Blanchot, Cravent; Daniel Potier, Vernon; Yves Palisson, Huiseau Sur Mauves, all of France

[73] Assignee: Professional General Electronic Products P.G.E.P., Courbevoie, France

[21] Appl. No.: 564,961

[22] Filed: Nov. 30, 1995

[30] Foreign Application Priority Data

Dec. 2, 1994 [FR] France .................... 94-14556

[51] Int. Cl.⁶ .................................................. H01R 13/502
[52] U.S. Cl. ........................................ 439/701; 439/208
[58] Field of Search .................... 439/650, 651, 439/652, 653, 654, 655, 701, 638, 207, 208, 210, 211, 212, 213, 214, 216, 209

[56] References Cited

U.S. PATENT DOCUMENTS 4,952,164  8/1990  Weber et al. .
5,292,257  3/1994  Milan ........................... 439/214
5,383,799  1/1995  Fladung ........................ 439/652

FOREIGN PATENT DOCUMENTS 0 009 151   8/1979   European Pat. Off. .
0 109 876  10/1983   European Pat. Off. .
0 413 241 A1  8/1990   European Pat. Off. .
0 498 405 A1  2/1992   European Pat. Off. .

*Primary Examiner*—Khiem Nguyen
*Assistant Examiner*—Yong Ki Kim
*Attorney, Agent, or Firm*—Lowe, Price, LeBlanc & Becker

[57] ABSTRACT

An electric device similar to a power strip and composed of an assembly of modular components with diverse functions, said modular components being fitted with cooperating mechanical and electrical interconnection means allowing to directly assemble them to each other. Said modular components consist of a front surface (1) with at least one specified function, of a contact support (5) wherein are mounted the means required to distribute the electric power, of a male end-fitting (2) and of a female end-fitting (3) comprising the mechanical and electrical connection means.

15 Claims, 9 Drawing Sheets

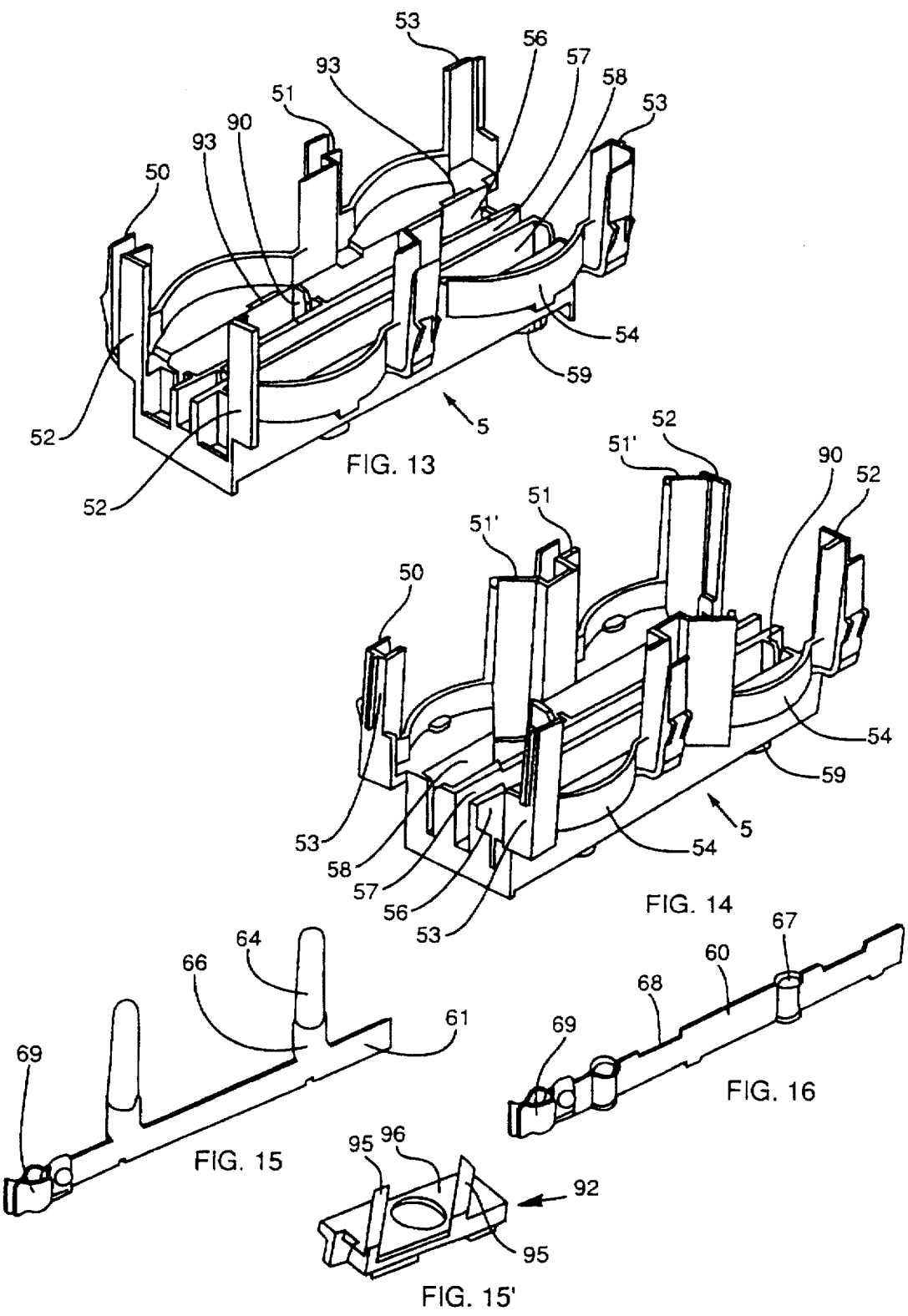

ELECTRIC DEVICE WITH MODULAR COMPONENTS

The present invention concerns an electric device composed of modular components with diverse functions and fitted with cooperating mechanical and electrical interconnection means.

Said cooperating interconnection means allow directly assembling said modular components to one another, without need for a tool or a complementary component, in order to form a power-strip.

Such a device includes a range of modular components making it possible to implement all conventional electric installations, illustratively such components constituting power outlets, circuit breakers, pilot lights, fuses or filters.

The modular components comprise one or several functional elements which are or are not identical.

The invention proposes an electric device similar to a power-strip composed of an assembly of modular components with various functions, said modular components being fitted with cooperating mechanical and electrical interconnection means allowing to assemble them one to another, characterized in that said modular components comprise a front surface with at least one specified function, a contact-support into which are mounted the means required to distribute the power, a male end-fitting and a female end-fitting, hereafter resp. male and female fittings, constituting the mechanical and electrical connection means.

The device of the invention furthermore evinces the following remarkable features:

- the contact support comprises three channels to receive the electric-power bars, i.e conductors,
- the central channel receives the ground-bar whereas the side channels receive the phase and neutral bars,
- the channels are closed from site to site by partitions located pairwise and perpendicularly to the channel walls while leaving between them a narrow passage into which the power bar is inserted,
- the male fitting comprises a planar pane to be affixed to the end of the contact-support in order to constitute an end wall of said support, further detent means to rigidly joint on to a female fitting,
- the detent means consist of two detent legs fitted with resilient strips,
- a boss divided into three cavities is present at the center of the pane of the said male fitting, the three cavities being situated in the extension of the channels,
- the female fitting comprises a planar pane designed to form an end wall of said contact support and recesses into which are inserted the detent means of a male fitting,
- clamps affixed to the ends of the contact bars are present inside the cavities of the male fitting and the flat ends of the contact bars run through the opening of the female fitting,
- a guard similar in its shape to a male fitting is affixed inside the female fitting to prevent the user from touching the flat ends of the bars situated in the opening,
- each female fitting is provided with a movable wall or end-fitting cover,
- the device comprises a terminal block to feed electric power to the modular components with a closed front surface and a contact support bearing three cable fasteners for the electric power cables and affixed to conducting blades visible in the female end of the terminal-block to which the modular components shall be connected,
- the female end of the terminal-block comprises an opening crossed by the conducting blades and further recesses, similar to this opening and to the recesses of the female ends of the modular components, to allow connecting the male fitting of a modular component to this female end,
- the terminal-block is fitted with a movable wall or terminal-block cover situated in the plane of the female end when no component is connected to the terminal-block and masking the conducting blades,
- the moving walls used to close the female fitting and/or the terminal-block are kept in their rest positions,
- disengaging means are provided to unlock the detent means.

The invention is elucidated in the following, illustrative and non-limiting description of an embodiment of the invention in relation to the attached drawings.

FIG. 1 is a perspective of a modular component with two power outlets and of the guard with which it may be fitted.

Figure 2:
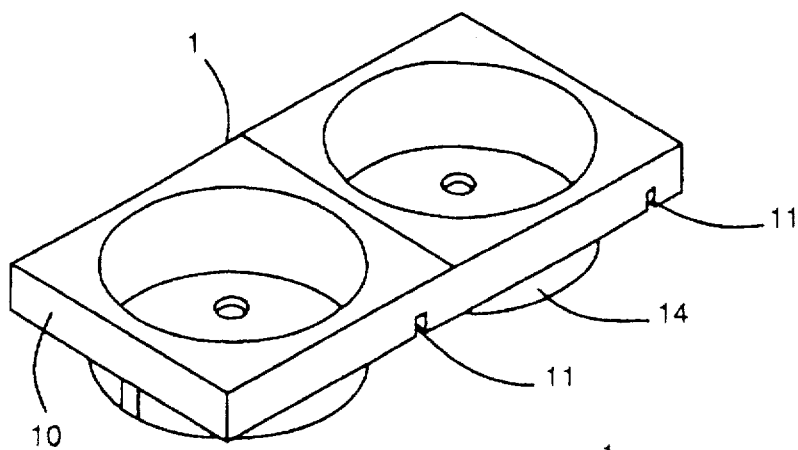
Figure 3:
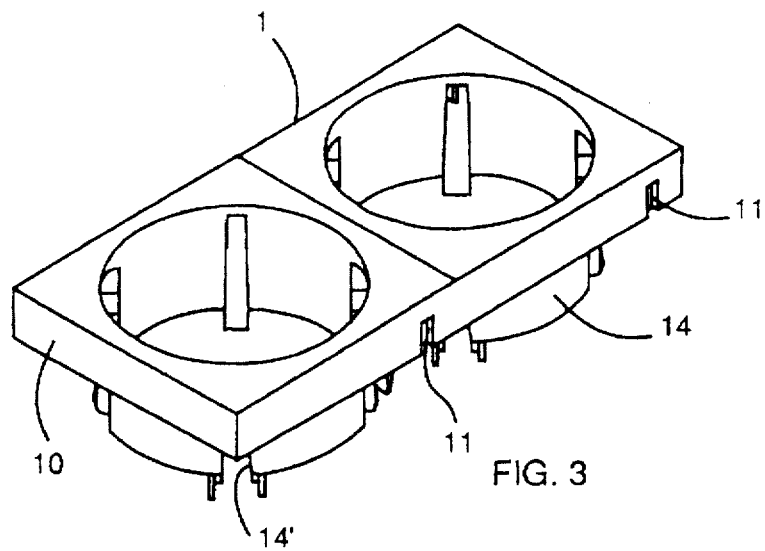
Figure 4:
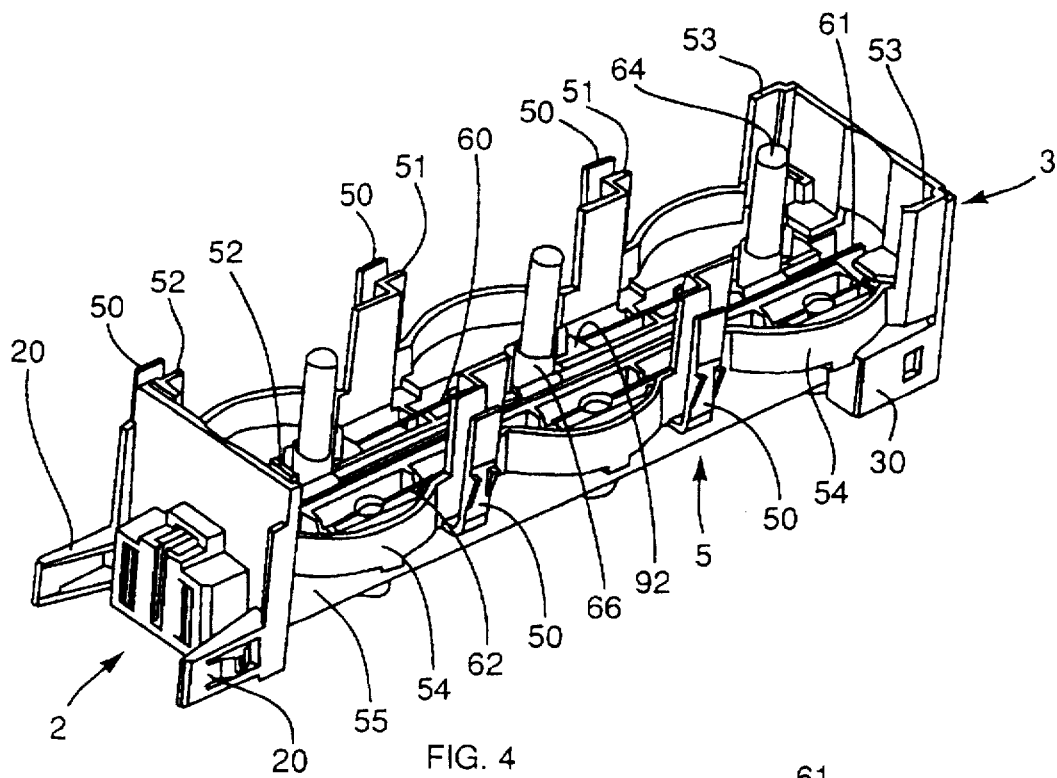
Figure 5:
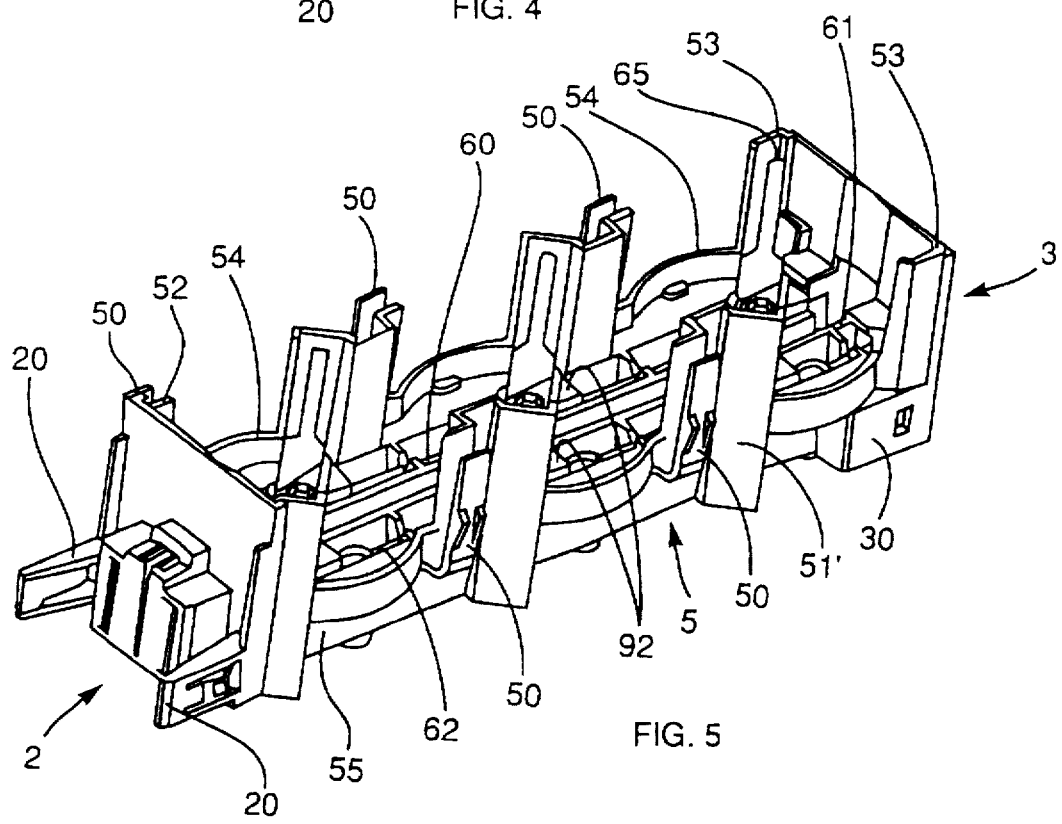
Figure 6:
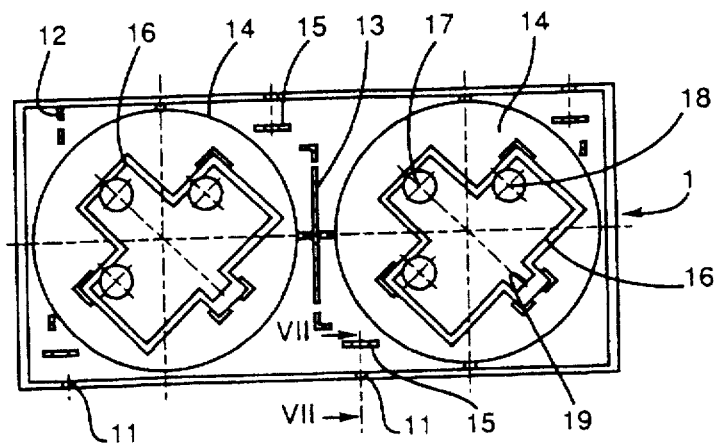
Figure 7:
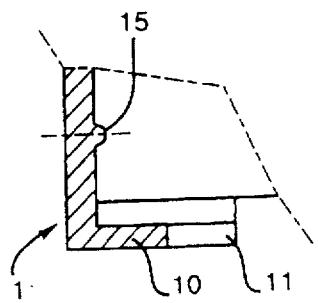
Figure 8:
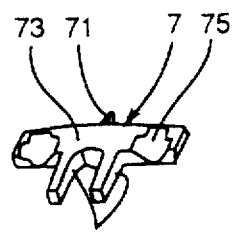
Figure 9:
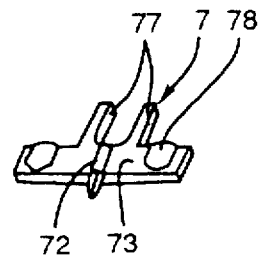
Figure 10:
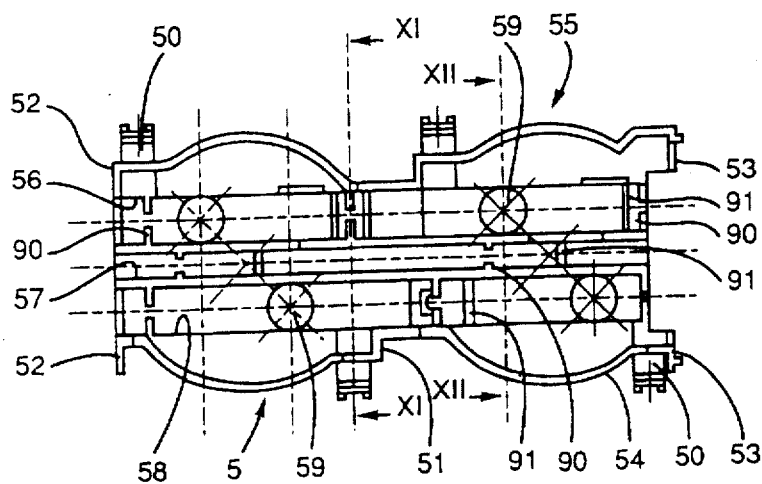
Figure 11:
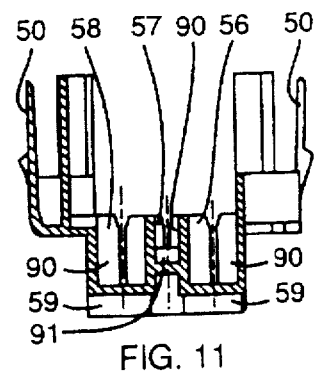
Figure 12:
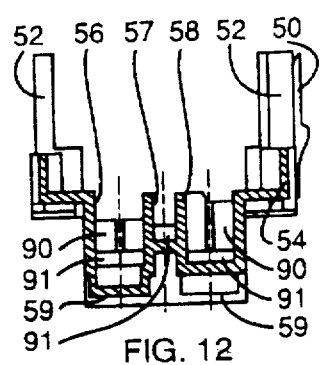
Figure 17:
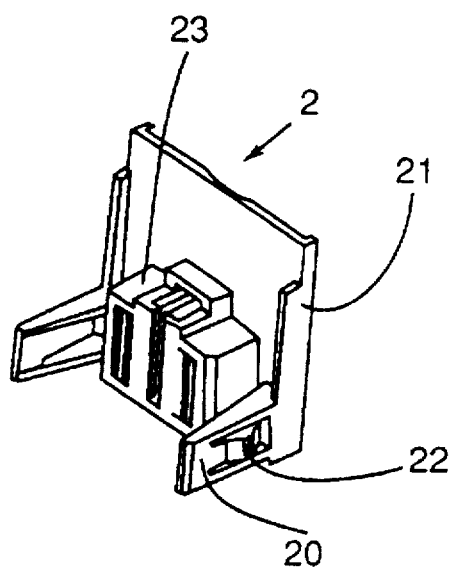
Figure 18:
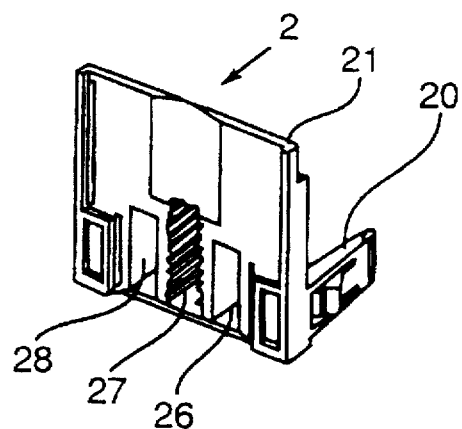
Figure 19:
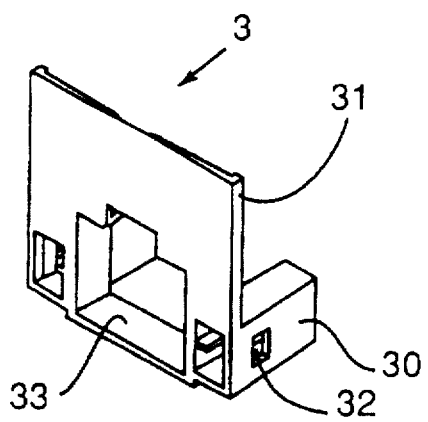
Figure 20:
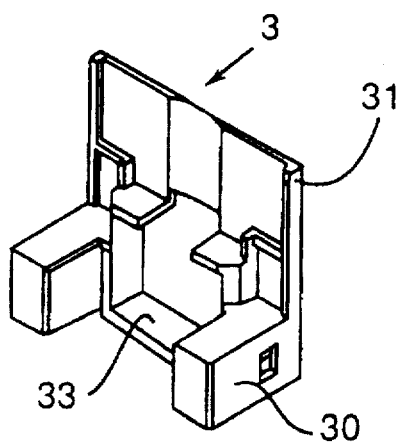
Figure 21:
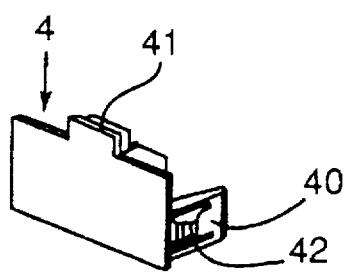
Figure 22:
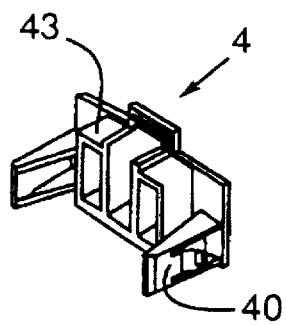
Figure 23:
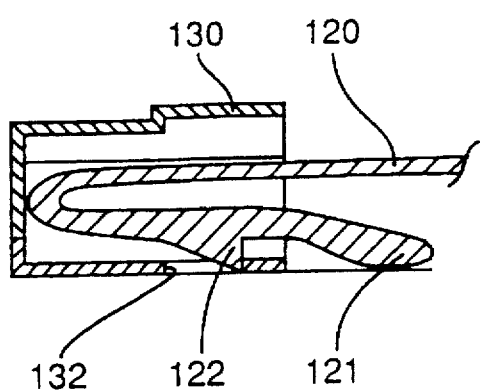
Figure 26:
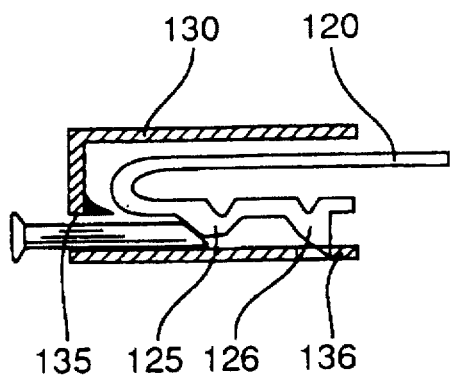
Figure 24:
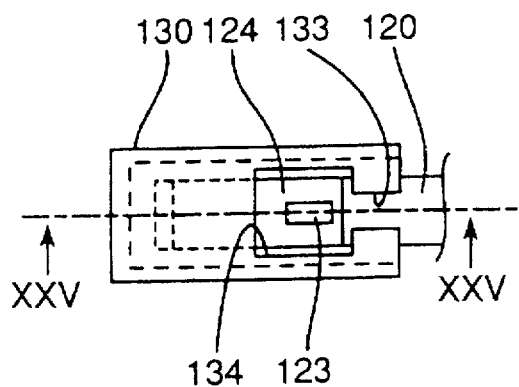
Figure 27:
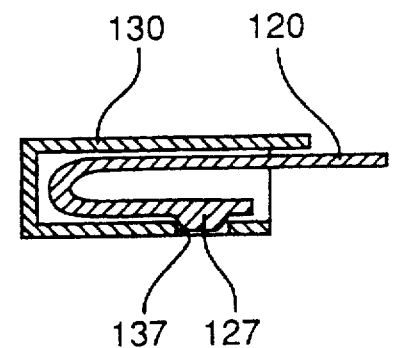
Figure 25:
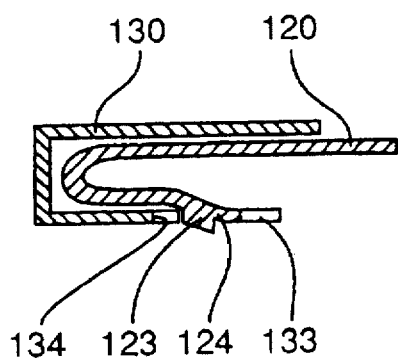
Figure 28:
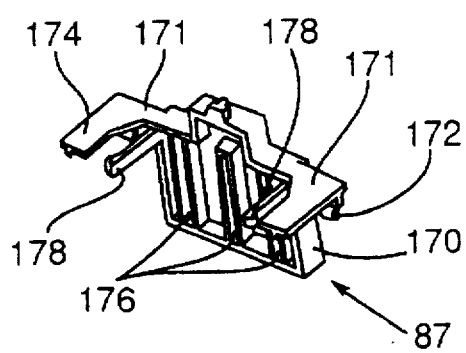
Figure 29:
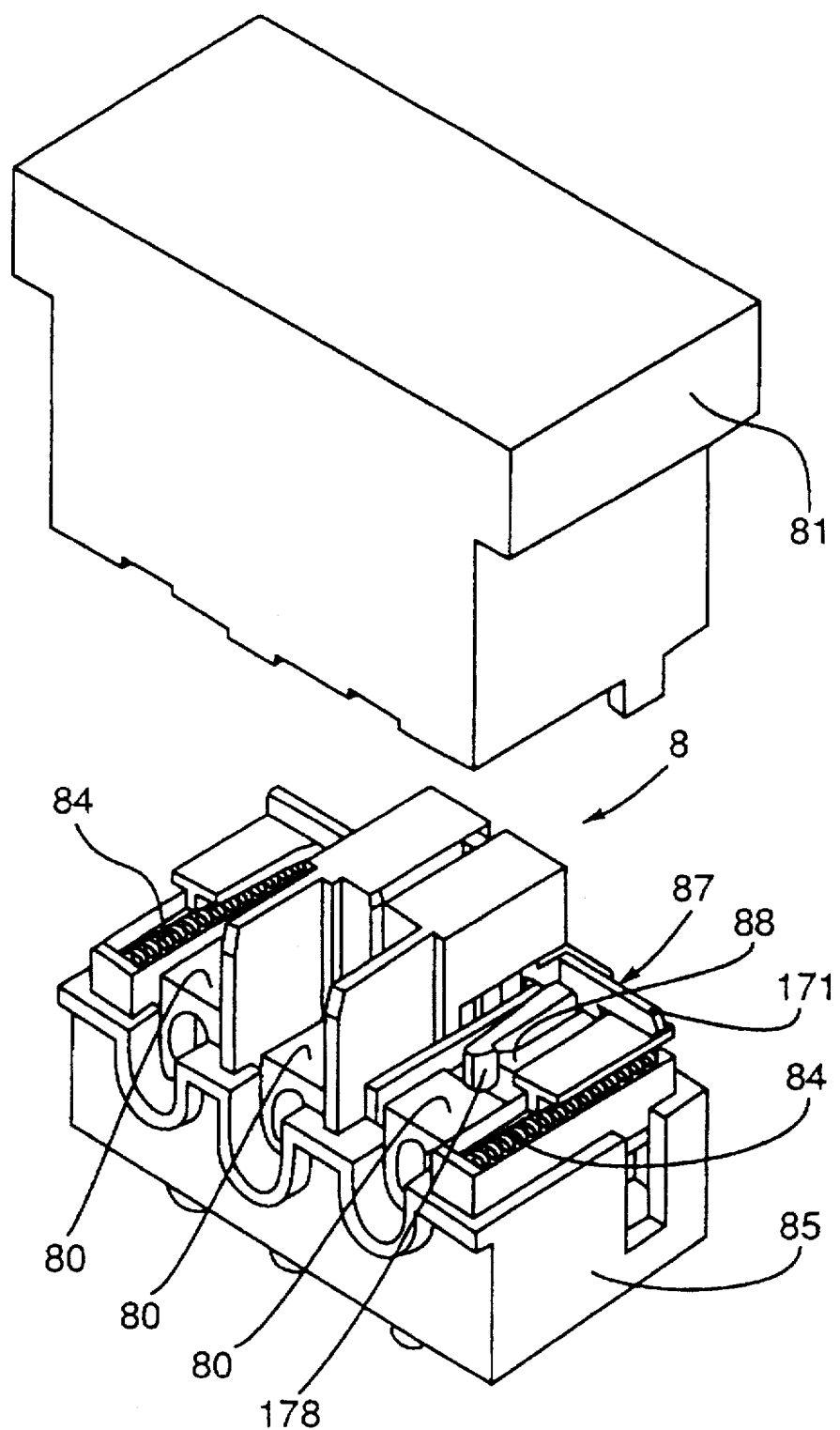
Figure 30:
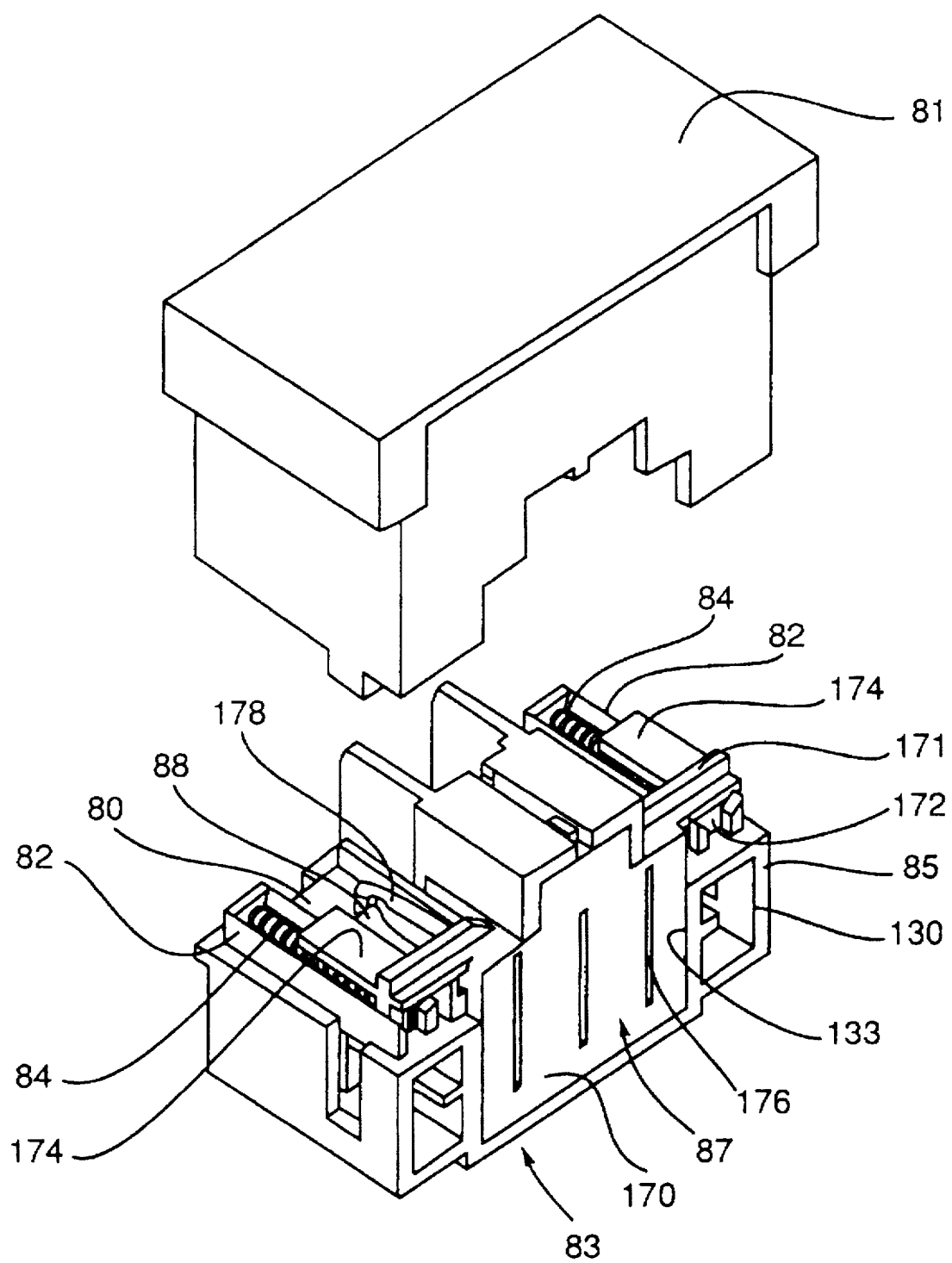
Figure 31:
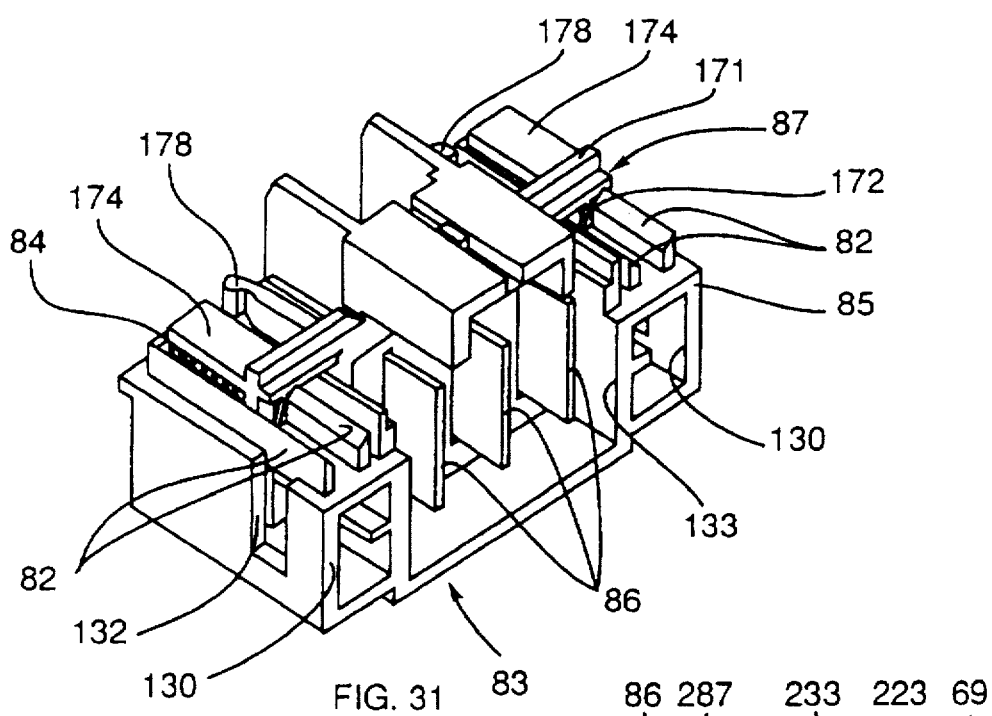
Figure 33:
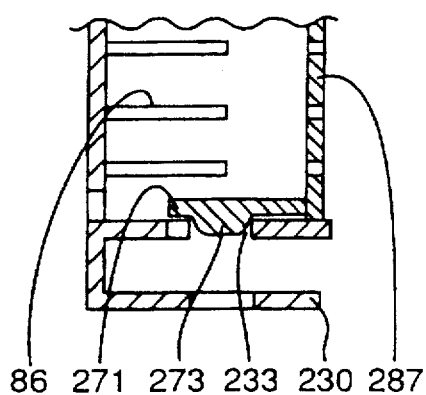
Figure 32:
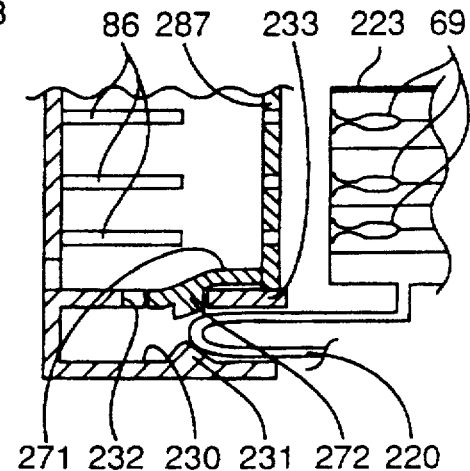
Figure 34:
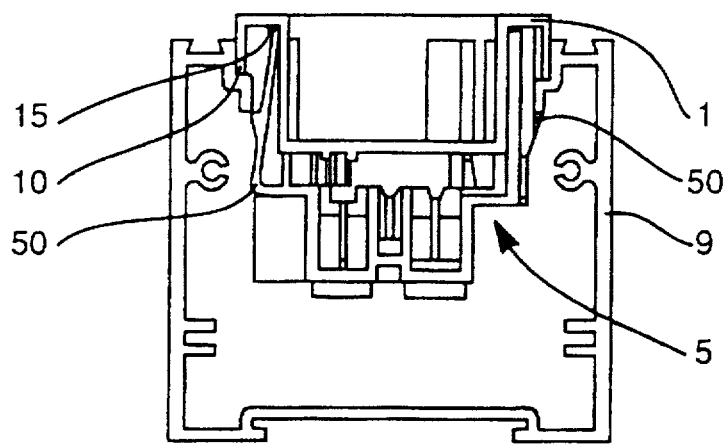

FIG. 2 shows the front surface of a component for two power outlets according to French standards, FIG. 3 shows the front surface of a component for two power outlets under German standards, FIG. 4 shows the contact support fitted with conducting elements and with male fittings and female fittings of a modular component for three power outlets under French standards, FIG. 5 corresponds to FIG. 4 for a modular component for three power outlets under German standards, FIG. 6 is a view from below of the front surface of FIG. 2, FIG. 7 is a partial section along line VII—VII of FIG. 6, FIG. 8 is a top view perspective of a recess cover, FIG. 9 is a perspective view from below of the recess cover of FIG. 8, FIG. 10 is a view from below of a contact support for a two-power outlet under French standards, FIG. 11 is a section along the line XI—XI of FIG. 10, FIG. 12 is a sectional view along line XII—XII of FIG. 10, FIG. 13 is a perspective of a contact support for a two power-outlet under French standards, the left end on the drawing receiving a male fitting, FIG. 14 is a perspective of a contact support for the two power-outlet under German standards, the left end of the drawing receiving a female fitting, FIG. 15 shows a ground-conductor element for a French-standard outlet, FIG. 15' shows a ground-conductor insulator, FIG. 16 shows a phase conductor, FIG. 17 shows the male fitting seen from outside the component, FIG. 18 shows the male fitting seen from inside the component, FIG. 19 shows the female fitting seen from outside the component, FIG. 20 shows the female fitting seen from inside the component, FIG. 21 shows the guard seen from the outside of the component, FIG. 22 shows the guard seen from inside the component, FIG. 23 is a section of a first embodiment of the mechanical connection means FIG. 24 is a side view of a second embodiment of the mechanical connection means, FIG. 25 is a section along the line XXV—XXV of FIG. 24, FIG. 26 is a section of a third embodiment of the mechanical connection means, FIG. 27 is a section of a fourth embodiment of the mechanical connection means, FIG. 28 is a perspective of terminal-block cover, FIG. 29 is a perspective rear view of the terminal-block with its cover in the sealed position, FIG. 30 is a perspective front view of the terminal-block with its cover in the sealed position, FIG. 31 is a perspective front view of the contact-support of the terminal-block, the cover being in the retracted position, FIGS. 32, 33 shows two embodiment variations of the terminal-block cover, FIG. 34 is a section showing the mounting of a component onto a rail.

FIG. 1 shows an overall parallelipipedic modular component of the invention. It comprises a front surface 1 of a shape to provide one or more functional elements, namely two power outlets under the French standards of FIG. 1 and a contact support 5 wherein are mounted the means needed to distribute the power.

This modular component moreover is fitted with male connectors on one of its small sides and with female connectors, masked in FIG. 1, on the other of its small sides.

These connectors provide mechanical and electrical connection between the modular components and are supported on a male end-fitting 2 and a female end-fitting 3 that shall be described in further detail below.

A guard 4 is provided to seal the female fitting 3 and to prevent accessing its connectors.

Resilient strips 50 affixed on the contact support 2 are arranged along the periphery of the modular component. These strips keep the modular component in a rail or in any other similar device and moreover allow keeping in place decorative plates around the front surface.

The upper side of the front surface is rectangular and enclosed by a dropping edge 10. Notches 11 are present in this dropping edge 10 to allow passing a small tool to force the resilient strips 50 back towards the module when this module must be disengaged from its retention means or from the decorative means with which it is engaged.

FIGS. 2 and 3 are two embodiments of a front surface of a modular component. These Figures show front surfaces for two functional elements, namely power outlets resp. corresponding to the French and German standards. These front surfaces 1 are fitted with cylindrical recesses 14 for the insertion of power plugs. The outlet recesses 14 of the German standards comprises notches 14' to pass grounding bands.

Differently-shaped surfaces are provided to outfit the modular components depending on their electrical functions. For instance there are front surfaces for power-outlet bases such as shown to be used with switches, circuit breakers, furthermore there are totally plane and closed front surfaces to cover components to which the user may not have access, etc.

FIGS. 4 and 5 show modular components, without the from surface, comprising three power outlets resp. corresponding to the French and German standards.

For simplification, the same references are retained for a component whether of two or three outlets and whether or not it corresponds to the French or German standards. Accordingly the reference 1 is used for all the front surfaces and the reference 5 for all the contact supports. Only the elements of different designs shall be denoted by different references.

The contact supports 5 overall are composed of a base 55 and uprights 51.

FIG. 5 shows a German-standards contact support for power outlets and it comprises, in addition to the French-standard contact support for power outlets, uprights 51' which shall allow mounting the ground strips.

The base 55 is shaped in such a way that it will support the electrical conductors constituted by the phase bar 60, the ground bar 61 and the neutral bar 62. In the embodiment of FIG. 4, the ground bar 61 bears ground pins 64 whereas in the embodiment of FIG. 5, the ground bar 61 bears yokes 65.

The embodiments of the drawings showing modular components with power outlets, comprise a base 55 with cylindrical portions 54 between which are mounted the uprights 51.

The uprights 52 located at one end of the contact support 5 are shaped in such a way that they allow affixation of the male fitting 2 whereas the uprights 53 at the other end are shaped in such a way they allow affixation of the female fitting 3. For that purpose the uprights comprise plane portions in the end plane of contact support.

These uprights are shown more clearly in FIGS. 13 and 14 wherein only the contact support 5 is represented.

FIG. 6 shows a front surface 1 as seen from below with a recess-sealing case resting against the lower surface of the 16 cylindrical recesses 14.

The recess cover 7 shown in FIGS. 8 and 9 is a known type cover and will be briefly described below:

The overall shape of this cover 7 is a T.

At rest, in the absence of an electric-power male-fitting pushed into the socket, the transverse bar 73 will be situated in front of the apertures 18 designed to pass the neutral and phase pins, and the sloping bosses 75 face the upper side of the front surface 1, whereas the bosses 78 face the case 16. The arms 77 are located on either side of the ground pin running through the aperture 17. The cover bears a rib 72 on its lower side and will tip about it unless subjected to a symmetrical action from the neutral and phase pins of the power outlet female fitting.

This cover 7 is forced back into the closed position by an omitted spring and resting against the housing 19 of the case 16 and located around the stud 71.

The lower side of the front surface 1 also is fitted with ribs 12, 13 that will come to rest against the upper ends of the uprights of the contact support 5 or against its base 55 when said pane is mounted on said contact support.

These ribs are not shown in further detail in the drawing but in general are flat and trapezoidal.

Shallow bosses 15 also are present underneath the front surface 1. These bosses 15 are opposite notches 11 and keep the resilient strips 50 retracted.

Such a position is shown in FIG. 34 wherein the modular component is mounted in a rail 9. The right-hand strip 50 is in its open position wherein it keeps the modular component in the rail 9, the left-hand strip having been forced behind the boss 15 on account of a tool inserted into an omitted notch 11.

As shown in FIGS. 10 through 12, the base 55 of the contact support 5 comprises three channels 56, 57 and 58 receiving the electric-power bars 60 through 62.

The central channel 57 receives the ground conductor and the side bars receive resp. the phase and neutral conductors.

These channels are partly sealed from place to place by walls 90 arrayed pairwise and perpendicularly to the channel walls while allowing between them a narrow passage into which the electric-power bar is inserted in such manner that said walls 90 constitute supports keeping said bars in position.

The electric-power bars rest on shallow cross-rods 91 crossing the channels.

The channels 56 and 58 receive the phase and neutral bars and are larger than the ground-bar channel so as to allow the presence of housings 67 required to insert the phase and neutral pins of the power outlet, their width being equal to the maximum diameter that the housings may assume when a pin is inserted.

These phase and neutral channels comprises recesses 59 receiving the ends of the phase and neutral pins when a male fitting is inserted into the socket.

FIGS. 15 and 16 show electric-power bars.

Illustratively the electric-power bars are made from a conducting laminate folded lengthwise in half.

FIG. 15 shows a ground bar 61 bearing the French-standard ground pins 64. These ground pins 64 are mounted into brackets 66 ensuring that the ground pin 64 shall be located above the phase channel 56 whereas the ground bar shall be located at the center of contact support. As regards the power outlets under the German standards, the yoke 65 is affixed to the ground bar 61 in oblique manner in order to move the ground elements against the uprights 51' of the contact support.

The brackets 66 must be above the phase bar and the yokes 65 must run above the phase and neutral bars.

An insulator 92 for the ground conductor such as shown in FIG. 15' when used for a French-standard outlet will be located between the brackets 66 of the ground bar and the phase bar in such manner to preclude shorts between these two bars. Regarding a German-standards outlet, two such insulators 92 of the ground conductors are located between each yoke 65 and the phase bar on one hand and the neutral bar on the other hand.

This insulator assumes the shape of a small plate bearing on its upper side, ribs 95 subtending between them a clearance 96 receiving a bracket 66 or a yoke 65. Said small plate bears ribs at its lower side which allow emplacing it on the phase or neutral channel, each of which is fitted with notches 93.

FIG. 16 shows a phase bar 60. This phase bar 60 consists of a conducting laminate bent lengthwise in half so as to form two blades one resting against the other, each blade comprising bosses subtending regularly distributed housings 67. Furthermore it comprises notches 68 along its upper edge to allow putting in place the ground-conductor insulator 92.

The neutral bar is omitted from the drawing. Similarly to the case of the phase bar, the neutral bar comprises longitudinally distributed notches 68 and housings 67, the relative positions of these notches and housings being different in order to allow for the spots taken up by the neutral recesses and the ground yoke 65.

A clamp 69 is affixed to one end of the electric-power bars. This clamp constitutes a female element of the electric connection implemented between modular components.

In the drawing's embodiment, these electric female elements are located in the male fitting 2 whereas the electric male elements constituted by the flat ends of the electric-power bars are located in the female fitting 3.

FIGS. 17 and 18 show the male fitting seen resp. from outside the modular component and from its inside.

This male fitting 2 comprises a planar pane 21 to be affixed to the uprights 52 present at the end of the contact support 5 in order to constitute an end wall (FIGS. 4 and 5).

Said male fitting is fitted with detent means to rigidly join it to the female fitting.

Said detent means consist of two detent legs 20 fitted with resilient strips 22 that in the example shown are located on the outside of this pane 21 and on each side of it.

By so arranging the detent means, the male fitting size may be reduced.

At the center of this pane 21 and still on its outside, a boss 23 is located which is divided by thin vertical walls into three cavities 26, 27 and 28. When the male fitting is affixed to the contact support, these three cavities will be located in the extensions of the channels 56 through 58. In that case the clamps 69 affixed to the ends of the contact bars 60 through 62 will be inside the cavities 26 through 28. In the embodiment shown, the surfaces of the central cavity 27 are fitted with grooves to allow high-grade molding of the component considering the substantial thickness of these walls.

The female fitting shown in FIGS. 19 and 20 also comprises a pane 31 which shall form the end wall of the contact support 5 and is affixed to the uprights 53.

This female fitting 3 comprises housings 30 running from the inside surface of said pane 31. Said housings 30 are dimensioned to match the insertion of the detent legs 20 of a male fitting 2 and comprise apertures 32 receiving the resilient strips 22.

The female fitting 3 is crossed by an aperture 33 of which the dimensions are substantially the same as the outside dimensions of the male fitting's boss 23. When the female fitting is affixed to the contact support, said aperture 33 will be opposite the channels 56 through 58 and the flat ends of the contact bars run through it as far as the pane 31.

During electric installation, the user selects those modular components bearing the functional elements he needs. Then he affixes these modular components to each other by inserting the detent legs 20 and the boss 23 of the male fitting of one of the components into the housings 30 and the aperture 33 of the female fitting of another component. Ipso facto, the cooperation between the detent legs 20 and the housings 30 and of the boss 23 with the aperture 33 assures the positioning and mechanical fixation in place of the modular components while the clamps 69 in the male fitting's boss clamp the flat ends located in the aperture 33 of female fitting and thus ensure electrical connection between the two components.

In the embodiment shown in the drawing, the components are electrically powered by the male fitting, as a result of which an assembly of modular components is achieved of which the last one terminates in the outer planar wall of a female fitting.

To prevent the user from touching the flat ends of the bars arranged in the aperture 33 of said female fitting, a guard 4 such as shown in FIGS. 21 and 22 is in place.

This guard 4 is similar to a male fitting 2 and comprises a solid planar pane 41 that, as shown, may be sized in such manner that it covers solely the low part comprising the aperture 33 of the female fitting's planar pane 31.

A boss 43 and detent legs 40 of the same dimensions as the boss 23 and the detent legs 20 of male fitting are present on the inside of the solid pane 41.

Said guard 4 therefore may be fitted onto the female fitting in the same manner as a male fitting and thus can seal the aperture 33.

When two modular components are snapped into each other or when a guard is mounted on a modular component, the resilient strips 22 or 42 of the detent legs 20 or 40 will be located in the apertures 32 of the housings 30.

To disconnect these components or remove the guard 4, said resilient legs must be forced back and toward the inside of the housings 30, for instance using a screwdriver, while simultaneously the components are moved away from each other.

FIGS. 23 through 27 show a variety of embodiment variations of the legs 20 and 40 and of the housings 30.

In these embodiments, the detent legs 120 comprise a bent-back portion whereby they assume a U-shape.

In the variation of FIG. 23, the bent-back portion is very long in order to form a support leg 121 extending outside the housing 130 when the connection has been made.

The resilient leg 120 moreover is fitted with a stud 122 designed to enter a housing aperture 132.

To disengage the components, it suffices to press the support legs 121 while simultaneously pulling apart the two components.

In the variation of FIGS. 24 and 25, the bent-back portion of the leg 120 is fitted with a strip 124 bearing on out outside a stud 123.

The housing 130 comprises an aperture 134 which may be entered by the strip 124. A recess 133 with a width at least equal to the thickness of the stud 123 connects said aperture to the open side of the housing 130.

To disengage the components, the stud 123 must be depressed whereby the strip 124 is forced toward the inside of the housing 130 while being made to escape from the aperture 134, with a simultaneous pull on the components to move them apart.

In these two embodiments, the user needs no tool. It is enough that he hold one of the components in one hand while depressing the drive strip 121 or the stud 123 and holding the other component in his other hand, and pull apart these two components.

In FIG. 26, the bent-back portion of the leg 120 is fitted with a stud 126 designed to enter an aperture 136, furthermore with a boss 125.

At its end the housing 130 comprises an aperture 135 wherein are located disengaging means such as a pushrod which may be fitted with a return spring in order to drive the bent-back portion of said leg by the action of said pushrod on the boss 125. The stud 126 leaves the aperture 136 as a result.

In the variation shown in FIG. 27, the bent-back portion of the leg 120 bears a rounded boss 127 entering an aperture 137 of the housing 130.

The rounded shape of the boss 127 allows disengaging the components merely by pulling them apart.

The bent-back portions of the legs 120 and the apertures 132 through 134 and 136, 137 may be made to point toward the outside of the modular components in the manner shown in the above Figures, but they also may be made to point toward the lower surface of said modular components. The resilient legs 20 of FIGS. 1 through 22 also may be made to point toward the lower side of the modular components.

In the embodiment variation shown by FIG. 27, the bent-back portion of the leg 120 may point in any desired direction because the user need not access it.

The modular components of the invention as well as the means implementing their connections, both mechanical and electrical, having been described, the terminal-block used to feed electric power to said components will now be discussed in relation to FIGS. 28 through 33.

Like all the modular components, this terminal-block 8 comprises a front surface 81 and a contact support 85.

The terminal-block's front surface 81 comprises a closed upper wall to preclude access to its inside when installed.

The contact support 85 bears three fasteners for the omitted cables providing electric power. Illustratively such fasteners are screw blocks 80 in the embodiment shown.

The screw blocks 80 are rigidly joined to conducting blades 86 at the female end 83 of the terminal-block.

The female end 83 is that end of the terminal-block to which the modular components are connected.

This female end 83 comprises both an aperture 133 crossed by conducting blades 86 and housings 130 with an aperture 132 similar to the aperture 33 and to the housings 30 of the female fittings 3 of the modular components. The male fitting 2 of a modular component thereby can be connected to this female end 83.

To offer the user a safe device, the terminal-block is fitted with a movable wall called the terminal-block cover 87 which is situated in the plane of the female end 83 when no modular component is connected to the terminal-block and which thereby masks the conducting blades 86.

The terminal-block cover 87 will be forced into this rest position wherein it masks the conducting blades 86 by springs 84 arranged in recesses subtended by ribs 82 of the contact support 85.

This terminal-block cover 87 comprises a plane side 170 of the same dimensions as the aperture 133. Said plane side 170 is crossed by three rectangular slits 176 to allow passing conducting blades 86.

Arms 171 are arranged on both sides of the plane side 170 and they bear both rest plates 172 to support the springs 84 and retaining plates 174 to keep said springs 84 in their housings.

Moreover the arms 171 bear resilient strips 178 with bent-back ends.

These resilient strips 178 are designed to come to rest against shoulders 88 of the contact support 85 in order to keep the cover 87 in its rest position against the forces exerted on it by the springs 84.

When a modular component is connected to such a terminal-block, the male fitting's boss 23 pushes against the cover 87 and forces it against the springs' reaction to enter the aperture 133. At the end of the connection procedure, the terminal-block cover is in the position shown in FIG. 31 wherein the conducting blades 86 are exposed.

At the same time the male fitting's detent-legs 20 are being positioned in the terminal-block housing 130 and their resilient, strips are being positioned in the apertures 132.

The clamps 69 present in this boss 23 move around the conducting blades 86 to assure the electric connection.

FIGS. 32 and 33 show variations of the male fitting which allow keeping the terminal-block in its rest position as long as a male fitting is away.

These variations offer the advantage of preventing the cover from being forced back by the user whether intentionally or accidentally whereby he might touch the conducting blades 86. In this manner the user working on his electrical installation without shutting off the power shall be protected nevertheless.

In the variation of FIG. 32, the terminal-block 287 bears arms 271 terminated by a stud 272.

The terminal-block contact support comprises a housing 230 with a window 232 in its wall separating it from the aperture 233 wherein are located the conducting blades 86.

At rest the stud 272 is therefore present in the window 232 of the housing 230, whereby the cover 287 is kept in its rest position as long as it is not deliberately actuated.

The housing 230 also comprises a boss 231 on its side opposite the window 232.

Resilient legs 220 bent-back to form a U are present on the male fitting's boss 223.

These legs 220 are inserted into the housings 230 when the male fitting is moved near and are forced by the boss 231 in contact with the stud 272 in such a way that this stud 272 moves out of the window 232 and the boss 223 is able to force the cover back to expose the conducting blades 86.

The male fitting legs 220 may be those which assure the mechanical connection, or they may be additional legs.

In the embodiment variation shown by FIG. 33, the legs 271 of the terminal-block cover bear rounded bosses 273 moved into apertures 233 of the housings 230.

In this variation, a significant force is required on the cover to displace it rearward and therefore any danger from intentional actuation is eliminated.

In order to endow the electrical installation with additional safety, each female fitting is fitted with a movable wall or female fitting-cover of the same type as the above described terminal-block cover, whereby the guards no longer are mandatory, at least when implementing variations such as shown in FIGS. 32 and 33 wherein the cover is kept in its rest position.

We claim:

1. Electrical device similar to a power strip and composed of an assembly of modular components of diverse functions, said modular components being fitted with cooperating mechanical and electrical interconnection means allowing to directly assemble them to each other, characterized in that said modular components are composed of a front surface (1) with at least one specified function, of a contact support (5) wherein are mounted the means required to distribute the electric power, further of a male end-fitting (2) and a female end-fitting (3) comprising the mechanical and electrical connecting means, said male fitting (2) comprising a planar pane (21) to be affixed to the end of the contact support (5) to form one end wall of it and detent means to affix it to a female fitting, and said female fitting (3) comprising a pane (31) which forms an end wall of the contact support (5) and housing (30) to insert detent means of a male fitting.

2. Device defined in claim 1, characterized in that the contact support (5) comprises three channels (56, 57, 58) to receive the electric-power bars, i.e. conductors (60, 61, 62).

3. Device defined in claim 2, characterized in that the central channel (57) receives the ground bar, whereas the side bars (56, 58) receive the phase and neutral bars.

4. Device defined in claim 2, characterized in that the channels (56, 57, 58) are partly closed from site to site by pairwise walls (90) running perpendicularly to the channel walls and with a narrow passage between them within which is inserted the current bar.

5. Device defined in claim 1, characterized in that the detent means consist of two detent legs (20) fitted with resilient strips (22).

6. Device defined in claim 1, characterized in that a boss (23) divided into three cavities (26, 27, 28) is present at the center of the pane (21) of said male fitting, the three cavities being arrayed in the extension of the channels (56, 57, 58).

7. Device defined in claim 1, characterized in that the female fitting (3) is crossed by an aperture (33) of which the dimensions are the same as the outer dimensions of the male-fitting boss (23) and which is opposite the channels (56, 57, 58).

8. Device defined in claim 7, characterized in that clamps (69) affixed to the ends of the contact bars (60, 61, 62) are present inside the cavities (26, 27, 28) of the male fitting (2) and in that the flat ends of the contact bars run through the aperture (33) of the female fitting (3).

9. Device defined in claim 8, characterized in that a guard (4) similar in shape to a male fitting is affixed in the female fitting to prevent the user from touching the flat ends of the bars inside the aperture (33).

10. Device defined in claim 8, characterized in that each female fitting (3) comprises a movable wall or fitting-cover.

11. Device defined in claim 1, characterized in that it comprises a terminal-block (8) to electrically power the modular components and comprising a closed front surface (81) and a contact support (85) bearing three fasteners for cables supplying the electric power and affixed to conducting blades (86) which can be seen in the terminal-block's female end (83) to which the modular components will be connected.

12. Device defined in claim 11, characterized in that the female end (83) of said terminal-block comprises an aperture (133) through which run the conducting blades (86) and further housings (130) similar to the aperture (33) and similar to the housings (30) of the female fittings of the modular components in such a way that said female end (83) can be connected to the male fitting (2) of a modular component.

13. Device defined in claim 11, characterized in that the terminal-block (8) is fitted with a movable wall or terminal-block cover (87) situated in the plane of the female end (83) when the terminal-block is disconnected from any modular component and in that it masks the conducting blades (86).

14. Device defined in claim 10, characterized in that the movable walls used to cover the female fitting (3) and/or the terminal-block (8) are kept in their rest positions.

15. Device defined in claim 1, characterized in that disengaging means are provided to unlock the detent means.

* * * * *